No. 836,724. PATENTED NOV. 27, 1906.
T. WHITTLE & W. CUMMING.
SHIP'S PROGRESS INDICATOR.
APPLICATION FILED JULY 18, 1905. RENEWED SEPT. 25, 1906.
2 SHEETS—SHEET 1.
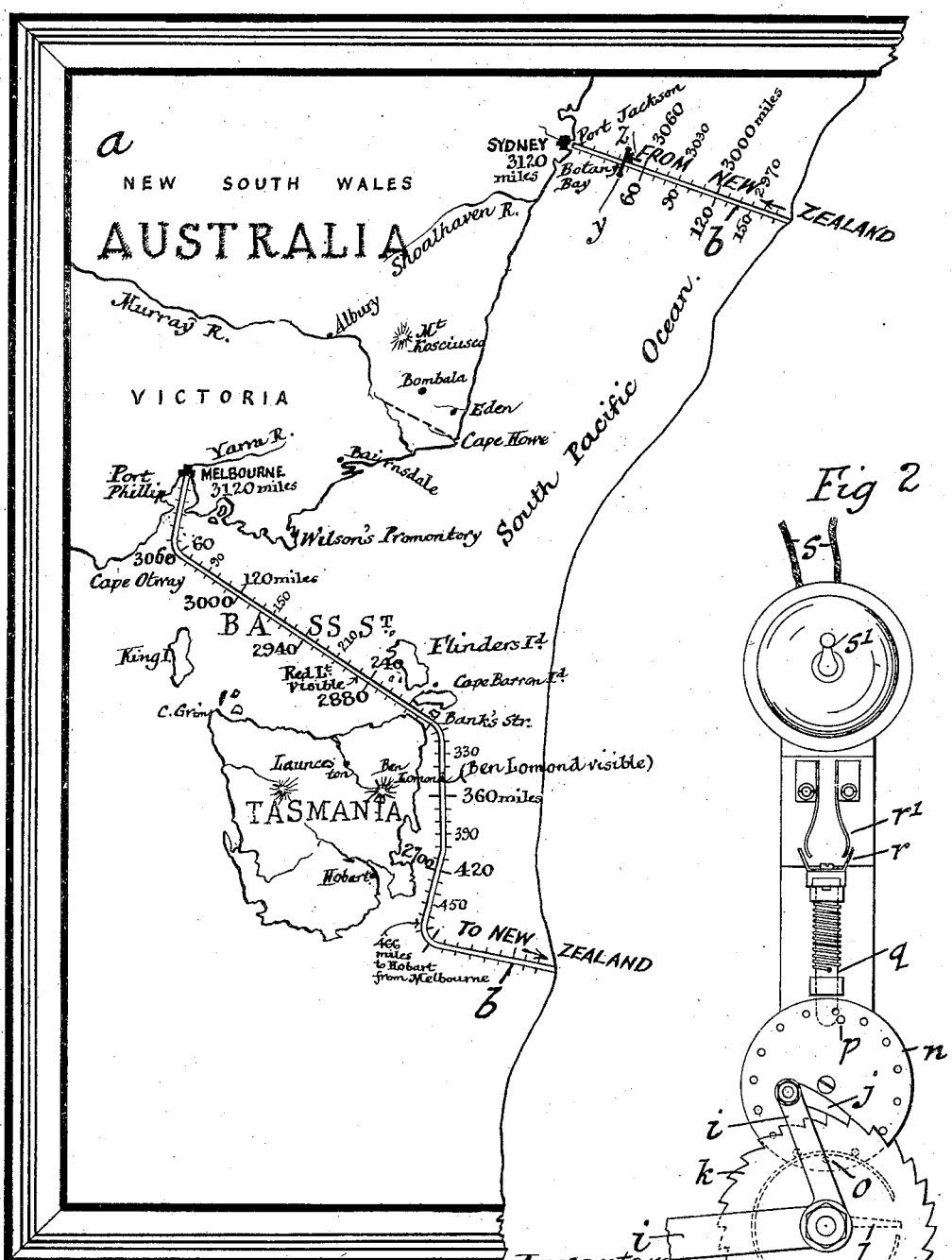

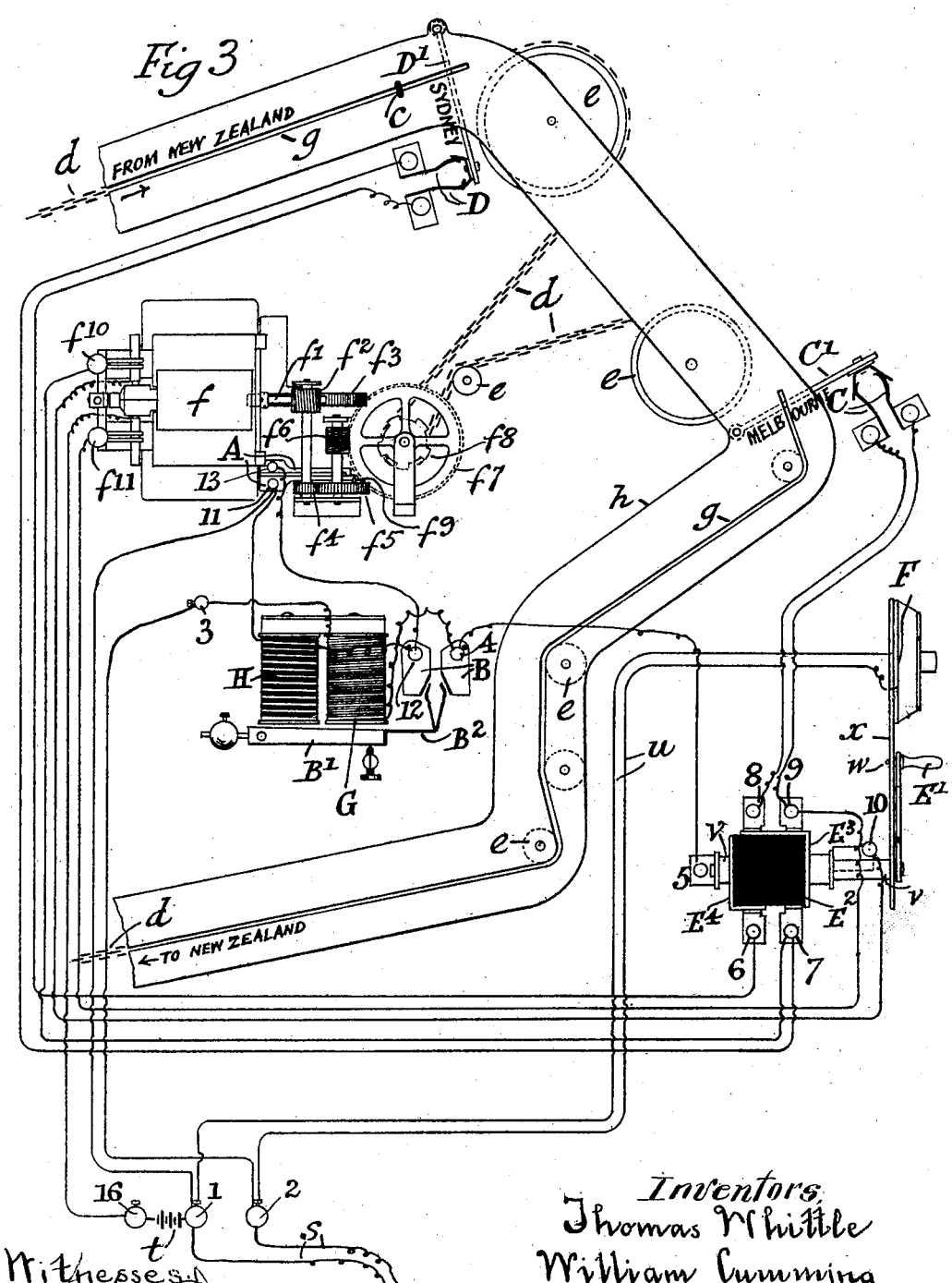

UNITED STATES PATENT OFFICE.

THOMAS WHITTLE, OF PRAHRAN, AND WILLIAM CUMMING, OF MALVERN, VICTORIA, AUSTRALIA, ASSIGNORS TO SAID WHITTLE.

SHIP'S PROGRESS-INDICATOR.

No. 836,724.     Specification of Letters Patent.     Patented Nov. 27, 1906.

Application filed July 18, 1905. Renewed September 25, 1906. Serial No. 336,189.

*To all whom it may concern:*

Be it known that we, THOMAS WHITTLE, residing at Prahran, near Melbourne, and WILLIAM CUMMING, residing at Malvern, near Melbourne, in the State of Victoria, Commonwealth of Australia, subjects of the King of Great Britain and Ireland, have invented certain new and useful Improvements in and Connected with Ships' Progress-Indicators; and we do hereby declare the following to be a full, clear, and exact description of the invention, such as will enable others skilled in the art to which it appertains to make and use the same.

The object of this invention is to provide means for indicating approximately at any moment the progress and position of a conveyance carrying passengers, and more particularly to indicate the progress and position of a steamship or other vessel upon its course or approximate course.

It is customary to publish once a day on some passenger vessels a statement of distance traveled and mark the position reached on a geographical map; but a new map is used each voyage, and neither passengers nor officers can obtain the information brought up to any particular moment when the same may be looked for. By this invention, however, a single geographical map is used for a plurality of voyages, both outward and inward.

The map may be set up in a glass frame, picture fashion, in any convenient part of the vessel, as in a saloon or cabin, or on deck, the interior mechanism or required parts of it being made accessible in any suitable way.

Passengers may by this invention time the vessel's speed and obtain useful geographical information without subjecting the officers to interrogations, which are often unseasonably resorted to under present conditions. The map has a track or route and an indicator or the like movable along it. The track indicates approximately, or as nearly as may be desired, the route to be traveled. When cheapness is an object, the indicator is set by hand or by simple mechanism from time to time at convenient intervals. It may, when under glass, be drawn into position, for example, by a magnet, or when attached to a chain, as hereinafter described, the chain may be adjusted by any convenient means. This invention provides, however, for the actuation of the indicator by connections to the engines of the vessel or to a wheel turned by a log drawn through the water.

Means are provided for advancing, stopping, or retracting the indicator at any moment independently of the engines to suit circumstances, and means are also provided for causing the movement of the indicator by the engines to take place in the reverse direction when the vessel is making a return journey.

There are sundry other details comprised in this invention; but to understand them and those above indicated reference should be made to the accompanying drawings.

In the drawings, Figure 1 shows a portion of a geographical map with a route or track and an indicator, as seen from the front. Fig. 2 is an elevation of means to be operated by the engines of the vessel to actuate indicator-moving mechanism. Fig. 3 shows indicator-moving mechanism which may be located at the rear of the map within the same casing and the means for stopping the indicator at proper times.

In the drawings, $a$ indicates a map; $b$, the ship's intended course or track, (shown as a slot;) $c$, (in Fig. 3,) the rear, and $y$, (in Fig. 1,) the front of a pointer or indicator, and $d$ a means for carrying the indicator. $d$ is shown as a chain passing over any suitable sprockets, pulleys, or the like $e$.

$f$ indicates any suitable driving means or power-supply, as a small series-wound electric motor, operating any suitable speed-regulating gearing. Thus the motor-spindle $f'$ carries worm $f^2$, which operates a spur-wheel $f^3$ on a spindle which carries pinion $f^4$, which drives gear-wheel $f^5$, the spindle of which carries a worm $f^6$, driving a wheel $f^7$, on the axle of which is mounted a sprocket-wheel or the like $f^8$, round which is passed and which drives a chain $d$ or the like.

Chain $d$ is shown in the position it assumes when set behind slot $b$ between it and another slot $g$, set in a suitably-supported rail or bar $h$, the indicator $y$ $c$ having a pin extending from slot $b$ to slot $g$. This is a convenient means of mounting the indicator; but parts $g$ and $h$ are obviously (like some others which are shown as being serviceable) not essential.

The control of the motor $f$ is by a switch A, which is hereinafter called the "time-switch" and which is normally open. It has two arms which a pin $f^9$, projecting from gear-wheel $f^5$, is adapted, once in each revolution of said wheel, to close together, thereby cutting out the motor from the circuit of the "motor-current," which intermittently drives it and is hereinafter described. This cut-out causes the motor to stop.

B B² are parts of a switch normally disconnected, but closed when an electric circuit is established by which the armature B' is raised, as hereinafter explained. Destination-switches are provided, (marked C C' and D D',) which while normally closed are so arranged that when the indicator reaches the end or predetermined point of the voyage where the switch is placed by the latter at that end or point is opened by the pressure of a part of the indicator on arm C' or D', normally kept closed, as by springs, (not shown,) and the motor will then be unable to operate, being cut out of circuit.

E represents a reversing-switch device, whereby the direction of rotation of the motor and the direction of motion of the indicator may be reversed and whereby the mechanism may at will be stopped. This device is controlled in any convenient manner, as by a handle E', turning a spindle $v$, mounted on which is a barrel of insulating material E², upon which is secured contact-plates, as E³ and E⁴. When the barrel is turned, the contact-plates are so shifted as to cut off or to reverse the motor-circuit, as may be required.

F shows a hand-operated switch for establishing what is called the "adjustment-circuit," whereby to drive the motor and the indicator at will independently of the vessel's engines. From the various switches suitable electrical conductors are provided either as shown or equivalently.

The motor $f$ does not move continuously as the ship does, but is set into operation intermittently, and it causes the indicator to move intermittently only, and by suitably designing the gearing which actuates the chain or the like the indicator is made to travel a distance corresponding approximately with the distance traveled by the vessel according to the number of revolutions of the engines or other basis adopted and according to the scale of the map provided with the track or slot, which is the guide of the indicator.

In Fig. 2 is shown a bent pivoted lever $i$, adapted to be pushed up and retracted at regular intervals, as by means of a connection (not shown) to the air-pump lever or any other suitable part of the ship's engines. By means of a pawl $j$ at the end of lever $i$ the wheel $k$, which is stiffly held by means not shown against movement by vibration, is turned one tooth at each said push. Wheel $k$ has a rear tooth or arm $l$ and a circular rib $m$, having a gap, as shown, whereby the rib will inclose a pin $o$ of the wheel $n$. At each revolution of arm $l$ the wheel $n$ will be turned one tooth. Then a pin $p$ at the rear of wheel $n$ will, once in each revolution of the latter, contact with a bar $q$ and raise it. This bar is normally depressed, as by a spring, thus keeping the electric switch $r\ r'$ (or starting-switch) open. When, however, bar $q$ is raised, that switch is closed. An electric circuit is thereby established through conductors which are shown further in Fig. 3 and are marked $s$. $s'$ shows a switch for use at will to prevent the establishing of this, which is called the "starting-circuit."

The starting-circuit takes a path by which the current passes in the order about to be stated by suitable conductors through terminal 1, a conductor $s$, starting-switch $r\ r'$, terminal 2, terminal 3, contact-bobbin G, terminal 4, terminal 5, and (through E⁴) terminal 6 of the switch device E, then through switch D to terminal 7 of switch device E, then to and through terminal $f^{10}$, the armature, and the terminal $f^{11}$ of motor $f$ to contact-plate 9 and (through E³) contact-plate 10 of switch device E, then to and through the motor-field coil to terminal 16 and through any suitable battery $t$ to terminal 1.

The map exhibits a portion of the Commonwealth of Australia, with the ends of a track to indicate a voyage from Melbourne to Tasmania, thence to New Zealand, and thence to Sydney. The details now being given, apply to the route illustrated, in which Melbourne is the starting-point and Sydney the destination.

The effect of establishing the starting-circuit is that it immediately causes armature B' to be attracted and raised by bobbin G, and by means of the contact-arm B², mounted on the said armature, as soon as this takes place the switch B B² is closed and has its terminals 4 and 12 connected, and thus there is immediately established another circuit, herein called the "motor-circuit," in which the current flows as follows: from battery-terminal 1 to terminal 11 of switch A, then through a holding-up bobbin H to terminal 12, then through B² to terminal 4, and then by the path already described in indicating the starting-circuit. By making the current pass through bobbin H the armature B' is kept up, and thus the switch B B² is kept closed, the consequent connection of terminals 12 and 4 allowing sufficient current to pass to drive motor $f$. The gearing actuated by the latter continues to move the chain and indicator until time-switch A operates by being closed by the action of pin $f^9$, whereupon a short circuit is established which cuts out the bobbin H. As soon as current deserts bobbin H armature B' drops and breaks the motor-circuit at switch B, cutting off the motor-current. The motor then stops, but not until its momentum causes the gearing to carry pin $f^9$ free of switch A, allowing it to open ready for the next passage of current by the motor-current, as above described.

When time-switch A is closed, the current takes a path of low resistance by flowing through battery-terminal 1 to switch-terminals 11 and 13 of A, thence to terminal 12, deserting bobbin H. When the direction of the current through the armature and field coil of the motor is to be reversed, in order to change the direction of motion of gearing $f''$ to $f^9$, chain $d$, and indicator $c$ any suitable means is used. Thus (by handle E') spindle $v$, barrel $E^2$, and plates $E^3$ and $E^4$ are turned so as to disconnect $E^3$ from the plates of terminals 8 and 9 and establish contact with the plates of terminals 6 and 7 and disconnect plate $E^4$ from the plate of terminal 6 and establish contact with that of terminal 8. Terminal 5 is in contact with a plate always contacting with $E^4$, and terminal 10 is in contact with a plate always contacting with plate $E^3$; but in an intermediate position of $E^3$ and $E^4$ they contact neither with the plates of terminals 6, 7, 8, or 9.

By adjusting the connections suitably, as set forth, the destination-switch D D' may be cut out of the motor-circuit, and, as will be readily understood by those versed in electricity, the destination-switch C C' may be put into that circuit, so that the destination-switch which is in the motor-circuit at any time when a starting-current is established is that destination-switch toward which the indicator is to be advanced. By turning handle E' (which usually has a stop-pin $w$ to enter any one of a series of suitable adjustment-holes in a base-plate $x$) to the intermediate position the contact-plates $E^3$ and $E^4$ become so located that no motor-circuit can be established.

The means E to $E^4$ and F, with their adjuncts for controlling the indicator, are of the greatest practical use in those situations and emergencies which occur during marine voyages. When switch F is closed, the conductors $u$ (between it and the battery-terminals 1 2) establish the aforesaid starting-circuit, except that conductors $s$ are replaced by conductors $u$, so that the motor-circuit is established, and the indicator is caused to move along its track either forward or backward, according to the setting of the switch device at E. Therefore whenever the indicator by reason of the ship making irregular headway or other cause happens to be out of its proper known position its position can be readily and immediately corrected at will.

It is obvious that our route-map is adapted to the display of advertisements both movable and stationary. The various applications of such advertising matter will readily suggest themselves.

The facility provided for rapidly adjusting part $y$ emphasizes the utility of the invention to passengers and officers.

Given proper mechanical skill in its construction the invention works with a high degree of accuracy, sufficiently so as to be of material value to ships' officers when below.

Any means may be used in lieu of that in Fig. 2, whereby to give a starting impulse to actuate the motor at suitable intervals. On long voyages the intervals will naturally be greater than on short ones. Where the vessel is proceeding near land, as along a river, the indicator is capable of pointing (when the map is suitable) to the names of the various places abreast of which the vessel comes.

Insulation and other details of electrical equipment well understood to be necessary, but not shown, are provided.

Any suitable means may be adopted for starting the indicator at intervals and stopping it, and the means for reversing its motion and regulating its position at will may also vary from those shown while not departing from the spirit of this invention.

While it is preferred to employ electricity, the invention is applicable without that agency by the application of spring-power, compressed air, mechanical gearing, or other known means of performing functions above indicated.

In Fig. 1 the ship's course is shown as a slot scaled, showing distances in miles, and with when desired notes of interest to passengers or others; but variations in and relating to the track may be made within the scope of this invention. The indicator is shown with a cross-arm $y$, and it may have an arrow or pointer $z$ fixed thereto. By turning the cross-arm $y$ round at the end of a voyage by any suitable means (not shown) the arrow is made to point in the direction of travel and on that side of the track which shows the mileage the ship has so far covered. When the pointer is used with a slot-track having double mileage marked thereon, the passengers are able to see not only how far the ship has traveled, but also how far it still has to go.

While we have shown our invention as particularly applied to steamships, we do not wish to be limited thereto, as it might also be applied to indicating the progress of any conveyance, as a train, street-car, or the like.

What we do claim as our invention, and desire to secure by Letters Patent of the United States, is—

1. In a progress-indicator for conveyances, a geographical map marked with a route thereon and an indicator movable along said route to show the course of movement of the conveyance, the line of said route being marked with subdivisions to indicate the distance therealong.

2. In a progress-indicator for conveyances, a geographical route-map, an indicator movable over the face of said map, means located beneath said map and acting on said indicator to move it, and mechanism for actuating said indicator-moving means by the operation of the conveyance-driving mechanism.

3. In a progress-indicator for conveyances, a route-map, an indicator movable over the face thereof to show the course of the said conveyance, mechanism located below the map engaging said indicator to move it, driving mechanism engaging said indicator-moving means, and mechanism, independent of the driving mechanism of the indicator, actuated by the driving mechanism of the conveyance for starting and stopping said indicator-driving mechanism.

4. In ships' progress-indicating devices, a geographical map provided with a track to indicate the ship's intended course approximately, an indicator adapted to be moved along the said track, and means for driving and stopping the indicator while the ship carrying it is traveling, substantially as set forth.

5. In ships' progress-indicating devices, a geographical map provided with a track to indicate the ship's intended course approximately, an indicator adapted to travel along said track and means for driving, stopping, and reversing the motion of the indicator while the ship carrying it is traveling, substantially as set forth.

6. In ships' progress-indicating devices, a geographical map having a slot therein marked with mileage or the like, to indicate the ship's intended course approximately, an indicator projecting through the slot, and means whereby the engines of the ship are adapted to intermittently move the indicator, substantially as set forth.

7. In ships' progress-indicating devices, a route-map having a track along the intended course, an indicator adapted to move along said track, an electric motor for moving said indicator, a source of electrical energy in circuit with said motor, and means operated by the ship's engines for intermittently interrupting the current in said circuit, substantially as set forth.

8. In ships' progress-indicating devices, a route-map having a track along the intended course, an indicator adapted to move along said track, an electric motor for moving said indicator, a source of electrical energy in circuit with said motor, mechanism connected to the ship's engines for making or breaking the flow of current through said circuit, and switches at the termini of the track adapted to be actuated by the arrival of the indicator thereat for stopping the passage of current through the motor when the indicator arrives thereat, substantially as set forth.

9. In ships' progress-indicating devices, a route-map having a track along the intended course, an indicator adapted to move along said track, an electric motor for moving said indicator, a source of electrical energy in circuit with said motor, mechanism connected with the ship's engines for making or breaking the flow of current through said circuit, and an operating mechanism for starting, stopping or reversing the flow of current into the motor-circuit independently of the mechanism connected to the ship's engines, substantially as set forth.

10. In ships' progress-indicating devices, a route-map having a track along the intended course, an indicator adapted to move along said track, a motor-circuit and an electric motor therein for moving said indicator, a starting-circuit intermittently opened and closed having a source of electric energy therein and connected to establish when closed an electric current along said motor-circuit, and mechanism actuated by the ship's engines for intermittently closing said starting-circuit, substantially as set forth.

11. In ships' progress-indicating devices, a route-map, a track along the intended course, an indicator adapted to move along said track, a motor-circuit and electric motor therein for moving said indicator, a starting-circuit intermittently opened and closed having a source of electrical energy therein and connected to establish when closed an electric current along said motor-circuit, mechanism actuated by the ship's engine for intermittently closing said starting-circuit and gearing connected with and actuated by said motor for periodically cutting out the motor and short-circuiting the current therefrom, substantially as set forth.

12. In ships' progress-indicating devices, a route-map, a track along the route to be traveled, an indicator movable along said track, mechanism acutated by the ship's engines for moving said indicator, and mechanism for reversing the movement of the indicator, substantially as set forth.

13. In ships' progress-indicating devices, a route-map, a track along the route to be traveled, an indicator movable along said track, an electric motor, mechanism between the motor and the indicator for actuating the latter, a motor-circuit, a motor-starting circuit normally open, mechanism connected with the ship's engines for intermittently establishing a current in said motor-starting circuit for starting the motor, a switch for completing the starting-circuit independently of the intermittent engine-actuating mechanism, and a current-reversing switch in circuit with the motor having a handle whereby it may be turned to cut off or reverse the current in the motor-circuit, substantially as set forth.

14. In ships' progress-indicating devices, a route-map, a track thereon indicating the route of the ship, an indicator movable along said track, an electric motor, mechanism between said motor and the indicator for moving the latter, a source of electrical energy, an intermittent circuit-breaking device and an electromagnet both in circuit with the said source of energy, an armature adapted to be attracted and moved by said magnet, a plug in said armature, separated switch-contacts adapted to be bridged by said plug in circuit with the battery and the motor, an electromagnet energized by the current in the motor-circuit for holding the said armature in position to keep the gap between the said switch-contacts closed, and means for cutting off the flow of current in the motor-circuit and so deënergizing the said magnet and allow the armature thereof to drop and withdraw said contact-plug, substantially as set forth.

15. In ships' progress-indicating devices, having means for the actuation by the ship's engines or the like of an indicator along a map-slot indicating approximately the vessel's route, means for adjusting or moving the indicator onward or reversely at will and for stopping it independently of the ship's engines.

16. In ships' progress-indicating devices, an indicator adapted to be moved in a map-slot, a destination or like switch adapted to be opened by the said indicator, and an electric starting-circuit adapted to be broken when the said switch is opened, substantially as and for the purposes set forth.

17. In ships' progress-indicating devices, the combination, with a route-slotted map, of an indicator, a carrying-chain or the like therefor, pulleys or rollers, and sprocket and other driving gear for said chain, a motor actuating said gearing, and means on the gearing to cause the stoppage of the motor without arresting its momentum, as set forth.

18. In ships' progress-indicating devices, the combination with a map, a route-track, an indicator movable therealong, an electric motor, mechanism between said indicator and the motor whereby the indicator may be moved, and normally closed circuit-breakers or destination-switches at the ends of the track, of a reversing-switch E having a central barrel $E^2$, the terminals 5 and 10 connected therewith, contact-plates $E^3$ $E^4$ mounted on the barrel, terminal 8 having a contact adapted to have electrical engagement with plates $E^3$ or $E^4$, and terminal 9 having a contact adapted to have electrical engagement with plate $E^3$, each of said terminals having electrical connection to one of the destination-switches, an electrical connection between terminal 9 and the armatures of the motor, terminal 6 having contacts adapted to have electrical engagement with plates $E^3$ or $E^4$, terminal 7 having a contact adapted to have electrical engagement with plate $E^3$, a connection between the terminals 6, 7 and the other destination-switch, a connection between the terminal 7 and the armature of the motor, a connection between the terminal 10 and a field-coil and the motor, and a connection between the terminal 5, a battery and the other field-coil of the motor, substantially as described.

19. In ships' progress-indicating devices, a route-track, an indicator movable along said track, a motor for moving said indicator, and a motor-circuit including said motor; in combination with a starting-circuit having in it a magnetic switch for completing the motor-circuit and two terminals of a switch $r'$, a movable switch-piece $r$ for connecting said terminals, sliding bar $q$ on which said switch-piece is mounted, a spring for holding said bar away from the switch $r'$, a rotatable wheel having teeth engaging with $q$ to raise it intermittently, and mechanism connected to the ship's engines for communicating intermittent rotation to said wheel, substantially as set forth.

20. In ships' progress-indicating devices, a route-map having a track-slot along the intended course, an indicator movable automatically along said slot, a flexible band located beneath said slot with which the indicator is connected, a wheel for moving said flexible band, gearing for rotating said wheel, an electric motor for driving said gearing, switches for reversing the action of the motor at the termini of the route-slot, and means for regulating the action of the motor from the engines of the ship, substantially as described.

In witness whereof we have hereunto set our hands in the presence of two witnesses.

THOMAS WHITTLE.
WILLIAM CUMMING.

Witnesses:
GEORGE G. TURRI,
A. M. HOLT.